(12) United States Patent
Liu et al.

(10) Patent No.: US 12,376,040 B2
(45) Date of Patent: Jul. 29, 2025

(54) POWER CONTROL FOR PUCCH TRANSMISSIONS WITH MULTIPLE TRPS

(71) Applicant: LENOVO (BEIJING) LIMITED, Beijing (CN)

(72) Inventors: Bingchao Liu, Beijing (CN); Chenxi Zhu, Beijing (CN); Wei Ling, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 438 days.

(21) Appl. No.: 17/633,747

(22) PCT Filed: Aug. 9, 2019

(86) PCT No.: PCT/CN2019/099973
§ 371 (c)(1),
(2) Date: Feb. 8, 2022

(87) PCT Pub. No.: WO2021/026683
PCT Pub. Date: Feb. 18, 2021

(65) Prior Publication Data
US 2022/0330163 A1    Oct. 13, 2022

(51) Int. Cl.
*H04W 52/14*    (2009.01)
*H04W 52/24*    (2009.01)
*H04W 52/34*    (2009.01)

(52) U.S. Cl.
CPC ....... *H04W 52/146* (2013.01); *H04W 52/242* (2013.01); *H04W 52/34* (2013.01)

(58) Field of Classification Search
None
See application file for complete search history.

(56) References Cited

U.S. PATENT DOCUMENTS

| 2014/0295909 A1* | 10/2014 | Ouchi | H04W 52/245 455/522 |
| 2015/0358924 A1* | 12/2015 | Papasakellariou | H04W 52/346 370/329 |

(Continued)

FOREIGN PATENT DOCUMENTS

CN    110089162 A    8/2019

OTHER PUBLICATIONS

ZTE, Sanechips, Offline summary for AI 7.6.1 NR UL power control in non-CA aspects, 3GPP TSG RAN WG1 Meeting AH 1801, R1-1801047, Jan. 22-26, 2018, pp. 1-28, Vancouver, Canada.

(Continued)

*Primary Examiner* — German Viana Di Prisco
(74) *Attorney, Agent, or Firm* — Kunzler Bean & Adamson (57) ABSTRACT

Methods, a remote unit and a base unit are disclosed. According to one embodiment, a method at a base unit, comprising: transmitting, to a remote unit, multiple power control parameters for physical uplink control channel (PUCCH) by higher layers signaling; and transmitting, to the remote unit, a transmit power control (TPC) command with downlink control information (DCI) format 2_2 scrambled by transmit power control-physical uplink control channel-radio network temporary identity (TPC-PUCCH-RNTI), wherein the power control parameters include more than 8 P0 values and more than 4 pathloss reference signals (PL-RSs).

20 Claims, 7 Drawing Sheets (56) References Cited

U.S. PATENT DOCUMENTS

| | | | | |
|---|---|---|---|---|
| 2017/0238260 | A1* | 8/2017 | Kim | H04L 1/1819 |
| | | | | 455/522 |
| 2017/0347327 | A1 | 11/2017 | Rahman et al. | |
| 2020/0092820 | A1* | 3/2020 | Chen | H04W 52/08 |
| 2020/0245181 | A1* | 7/2020 | Dinan | H04W 52/04 |
| 2020/0314664 | A1* | 10/2020 | Zhou | H04L 25/0226 |
| 2022/0201619 | A1* | 6/2022 | Yao | H04W 52/242 |
| 2022/0217647 | A1* | 7/2022 | Matsumura | H04W 52/146 |
| 2022/0321292 | A1* | 10/2022 | Matsumura | H04L 5/0048 |

OTHER PUBLICATIONS

Ericsson, Signalling reduction for beam-based UL power control, 3GPP TSG-RAN WG1 Meeting #97, Tdoc R1-1907475, May 13-May 17, 2019, pp. 1-3, Reno, USA.

International Searching Authority, "Written Opinion of the International Searching Authority," PCT/CN2019/099973, Apr. 29, 2020, pp. 1-4.

Vivo, Futher Discussion on Multi-TRP Transmission, 3GPP TSG RAN WG1 #96bis, R1-1904096, Apr. 8-12, 2019, pp. 1-14, Xi'an, China.

Huawei, Hisilicon, Enhancements on Multi-TRP/panel transmission, 3GPP TSG RAN WG1 Meeting #96bis, R1-1905523, Apr. 8-12, 2019, pp. 1-22, Xi'an, China.

3GPP, Technical Specification Group Radio Access Network; NR; Physical layer procedures for control (Release 15), 3GPP TS 38.213 V15.6.0, Jun. 2019, pp. 1-107.

Huawei et al., "Summary of AI: 7.2.8.2 Enhancements on Multi-TRP/Panel Transmission of Offline Discussion", 3GPP TSG RAN WG1 Meeting #96bis R1-190abcd, Apr. 8-12, 2019, pp. 1-1.

Intel Corp., "On multi-TRP/multi-panel transmission", 3GPP TSG RAN WG1 Meeting #97 R1-1907559, May 13-17, 2019, pp. 1-21.

* cited by examiner

POWER CONTROL FOR PUCCH TRANSMISSIONS WITH MULTIPLE TRPS

FIELD

The subject matter disclosed herein generally relates to wireless communications and, more particularly, to power control for PUCCH transmissions with multiple TRPs.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Multiple User MIMO (MIMO), Frequency Range 1 (FR1), Frequency Range 2 (FR2), Physical Uplink Shared Channel (PUSCH), Physical Downlink Control Channel (PDCCH), Sounding Reference Signal (SRS), SRS Resource Indicator (SRI), Downlink Control Information (DCI), Resource Block (RB), Non Zero Power (NZP) Channel State Information Reference Signal (CSI-RS), Control Resource Set (CORESET), Bandwidth Part (BWP), Quasi Co-location (QCL), Transmission Configuration Indicator (TCI), transport block (TB), Hybrid Automatic Repeat Request Acknowledgement (HARQ-ACK), Positive Acknowledgement (ACK), Negative Acknowledgement (NACK), Physical Downlink Shared Channel (PDSCH), Code Block (CB), Code Block Group (CBG), Radio Resource Control (RRC), New Data Indicator (NDI), Configured Grant (CG), Downlink Feedback Information (DFI), Listen-before-Talk (LBT), Identification (ID), Semi Persistent Scheduling (SPS), Code Block Group Transmission Information (CBGTI), Carrier Indicator Field (CIF), Autonomous Uplink (AUL), Transmission Power Control (TPC), Radio Network Temporary Identifier (RNTI), Cell-RNTI (C-RNTI), Configured Scheduling RNTI (CS-RNTI), Transmitted Precoding Matrix Indicator (TPMI), Transmission Mode (TM), Redundancy Version (RV), Transmit and Receive Point (TRP), Channel State Information (CSI), Demodulation Reference Signal (DMRS), Time Division Multiplexing (TDM), Network (NW), Component Carrier (CC), Media Access Control (MAC), Control Element (CE), Reference Signal Received Quality (RSRQ), Signal and Interference to Noise Ratio (SINR), Layer 1 (L1), Control Resource Set (CORESET), Physical Random Access Channel (PRACH), Bit Error Rate (BER), pathloss reference RS (PL-RS), Primary Cell (PCell), Secondary Cell (SCell), System Information Block (SIB).

In NR Release-15, only DL transmission from a single TRP is supported. Support for multiple TRPs DL MIMO transmission will be included in NR Release-16.

Enhancements on multiple TRPs DL transmission including improved reliability and robustness with both ideal and non-ideal backhaul between TRPs will support downlink control signaling enhancement for efficient support of non-coherent joint transmission and enhancement on uplink control signaling and/or reference signal(s) for non-coherent joint transmission.

To support separate HARQ feedback associated with received PDSCH transmissions scheduled by multiple DCIs transmitted from multiple TRPs, TDMed PUCCH transmissions for two or more TRPs within a single slot should be supported. Furthermore, power control on PUCCH should also be enhanced to support multiple PUCCH transmissions associated with multiple TRPs.

This invention is aimed at apparatus and methods to address a power control issue for multiple PUCCH transmissions by a UE to multiple TRPs.

SUMMARY

Methods and apparatuses for providing a power control mechanism for PUCCH transmissions to multiple TRPs are disclosed.

In one embodiment, a method at a base unit, comprises: transmitting, to a remote unit, multiple power control parameters for PUCCH by higher layers signaling; and transmitting, to the remote unit, one or more TPC command with DCI format 2_2 scrambled by TPC-PUCCH-RNTI, wherein the power control parameters include more than 8 P0 values and more than 4 PL-RSs. Here, P0 is the target received power at the base unit and PL-RS indicates a DL RS used by the remote unit to estimate the path loss of UL channel. The remote unit may calculate the transmit power for PUCCH transmission based on P0, UL channel pathloss and the TPC command.

Preferably, one or more P0-sets each of which contains one or more of the P0 values and one or more PL-RS sets each of which contains one or more of the PL-RSs are configured for the UE by higher layers signaling.

Preferably, one or more PUCCH groups are configured each of which contains one or more PUCCH resources transmitted to the same TRP, wherein each of the PUCCH groups is associated with one of the P0-sets and one of the PL-RS sets.

Preferably, one or more CORESET groups are configured each of which contains one or more CORESETs configured for the same TRP, wherein each of the CORESET groups is associated with one or more PUCCH groups.

Preferably, the TPC command carried by DCI format 2_2 includes more than one TPC command fields for the remote unit in a cell.

Preferably, two or more block number indices in the TPC command are transmitted to the UE, wherein the two or more block number indices are assigned to the UE in a cell and each block number index corresponds to one TPC command field, and wherein each of the TPC command fields in the DCI format 2_2 is associated with one or more PUCCH groups.

In another embodiment, a method at a remote unit, comprises: receiving multiple power control parameters for PUCCH from a base unit, and receiving one or more TPC command with DCI format 2_2 scrambled by TPC-PUCCH-RNTI from the base unit, wherein the power control parameters include more than 8 P0 values and more than 4 PL-RSs.

In another embodiment, a base unit, comprises a transceiver; a memory; and a processor coupled to the transceiver and the memory and configured to: control the transceiver to transmit, to a remote unit, multiple power control parameters for PUCCH by higher layers signaling; and control the transceiver to transmit, to the remote unit, one or more TPC command with DCI format 2_2 scrambled by TPC-PUCCH-RNTI, wherein the power control parameters include more than 8 P0 values and more than 4 PL-RSs.

In another embodiment, a remote unit, comprises a transceiver; a memory; and a processor coupled to the transceiver and the memory and configured to: control the transceiver to receive multiple power control parameters for PUCCH from a base unit, and control the transceiver to receive one or more TPC command with DCI format 2_2 scrambled by TPC-PUCCH-RNTI from the base unit, wherein the power control parameters include more than 8 P0 values and more than 4 PL-RSs.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not, therefore, to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entire hardware embodiment, an entire software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scene, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, may be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that may direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

Figure 1:
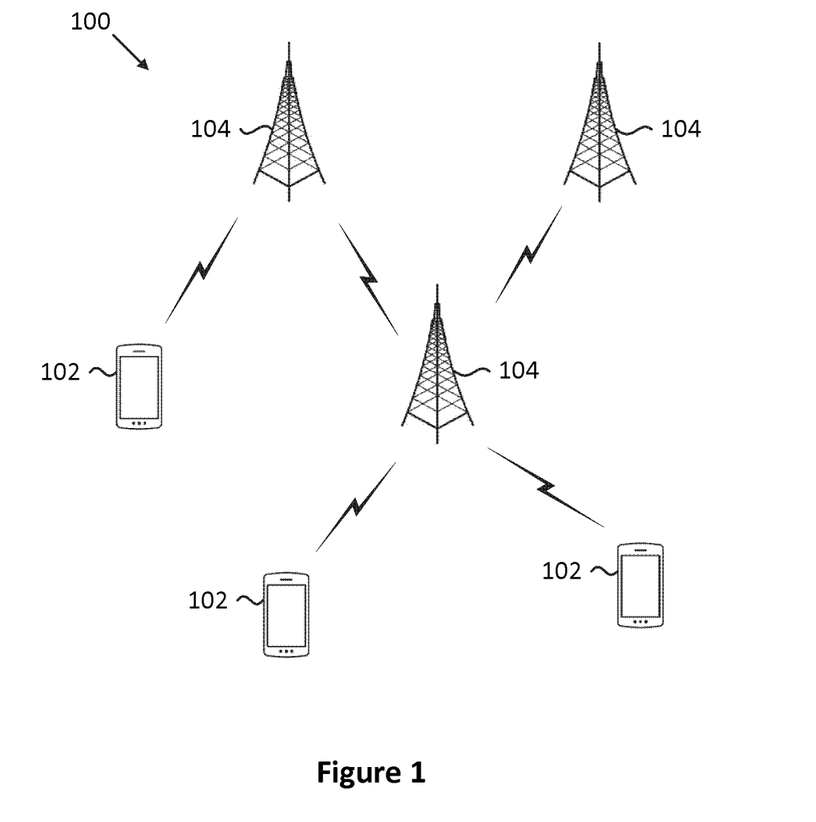
FIG. 1 is a schematic block diagram illustrating one embodiment of a wireless communication system for retransmitting uplink control information.

FIG. 1 depicts an embodiment of a wireless communication system 100 for PUCCH transmissions with multiple TRPs. In one embodiment, the wireless communication system 100 includes remote units 102 and base units 104. Even though a specific number of the remote units 102 and the base units 104 are depicted in FIG. 1, it should be noted that any number of the remote units 102 and the base units 104 may be included in the wireless communication system 100.

In one embodiment, the remote units 102 may include computing devices, such as desktop computers, laptop computers, personal digital assistants ("PDAs"), tablet computers, smartphones, smart televisions (e.g., televisions connected to the Internet), set-top boxes, game consoles, security systems (including security cameras), vehicle onboard computers, network devices (e.g., routers, switches, modems), or the like. In some embodiments, the remote units 102 include wearable devices, such as smartwatches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the field. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the field. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the field.

In one implementation, the wireless communication system 100 is compliant with the 3GPP 5G new radio (NR). More generally, however, the wireless communication system 100 may implement some other open or proprietary communication protocol, for example, WiMAX, among other protocols.

The base units 104 may serve a number of the remote units 102 within a serving area, for example, a cell or a cell sector via a wireless communication link. The base units 104 transmit DL communication signals to serve the remote units 102 in the time, frequency, and/or spatial domain.

Figure 2:
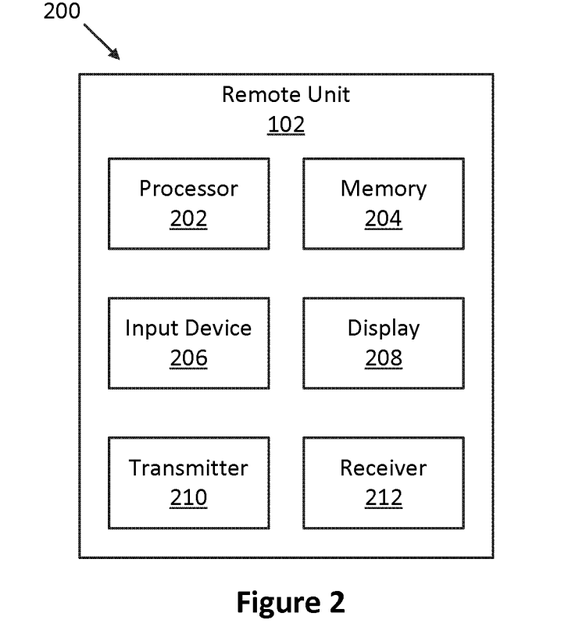
FIG. 2 is a schematic block diagram illustrating one embodiment of an apparatus that may be used for retransmitting uplink control information.

FIG. 2 depicts one embodiment of an apparatus 200 that may be used for PUCCH transmissions with multiple TRPs. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smartwatch, smart glasses, a heads-up display, or the like. Further, the display 208 may be a component of a smartphone, a personal digital assistant, a television, a tablet computer, a notebook (laptop) computer, a personal computer, a vehicle dashboard, or the like.

In certain embodiments, the display 208 includes one or more speakers for producing sound. For example, the display 208 may produce an audible alert or a notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and the display 208 may form a touchscreen or a similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the broadcast signal. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
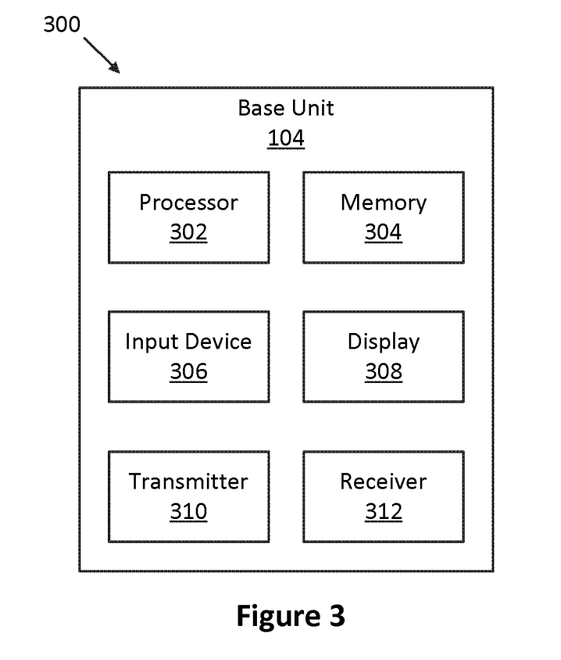
FIG. 3 is a schematic block diagram illustrating one embodiment of an apparatus that may be used for retransmitting uplink control information.

FIG. 3 depicts one embodiment of an apparatus 300 that may be used for power control for PUCCH transmissions with multiple TRPs. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit signaling to the remote unit. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In wireless systems, it is often required to either increase or decrease the transmit power of a UE. This is known as uplink power control. The uplink power control procedure determines the transmit power of different uplink physical channels (PUCCH, PUSCH) or signals (SRS, PRACH). Transmit power is increased to meet a required SNR or BER at the gNB. Transmit power is decreased to minimize co-channel interference of a 5G system. There are two types of power controls schemes—an open loop power control and a close loop power control.

In the open loop power control scheme, there is no feedback from UE to gNB. In open loop power control, the UE estimates uplink path loss based on downlink measurements and sets the transmit power accordingly. The open loop power control scheme depends on power related parameters transmitted in SIBs or dedicated RRC messages, such as P0, which is the target received power at the gNB side, and PL-RS, which indicate a DL RS used to estimate the UL channel path loss.

In the close loop power control, feedback is used for adjusting the transmit power level. Close loop power is based on network configured explicit transmit power control (TPC) command. These commands are actually determined based on the received uplink power previously measured by the network. An examples of transmit a power control command include transmitting a TPC command in a dedicated DCI format.

Figure 4:
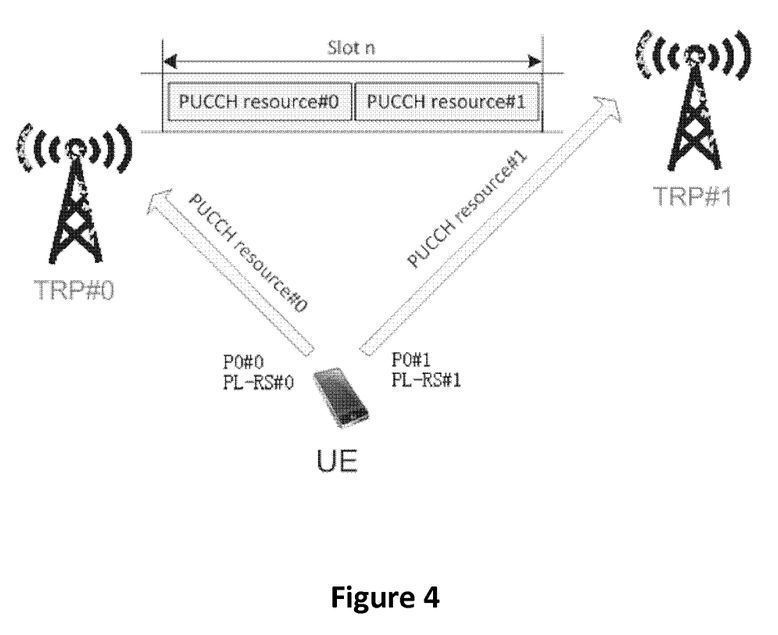
FIG. 4 is a schematic illustrating TDMed PUCCH transmissions to multiple TRPs.

FIG. 4 is a schematic illustrating TDMed PUCCH transmissions with multiple TRPs.

For PUCCH power control, a gNB configures power control parameters for a UE to calculate an open loop power. The power control parameters include target receiving power P0 and pathloss reference signal (PL-RS). In NR Release-15, for FR1 (450 MHz-6000 MHz), since only transmission from single TRP is supported, gNB configures only one P0 value and one PL-RS for PUCCH.

It has been agreed that a separate HARQ feedback transmitted on multiple PUCCH resources to different TRPs within a slot will be supported for at least the FR1. As illustrated in FIG. 4, PUCCH resource #0 and PUCCH resource #1 are transmitted within the same slot n to TRP #0 and TRP #1 respectively by a UE. That is the UE needs to maintain two radio links, i.e. one with each TRP. Different PUCCH resources may be corresponding to different TRPs, and therefore, independent power control parameters for different PUCCH resources are needed to cope with different channel environments. Separate open loop and close loop power control parameters are also required for each radio link both in the FR1 and FR2 (24.25 GHz-52.6 GHz) spectrums. Beam-specific power control for PUCCH is supported in Release-15 for the FR2, however, only one set of power control parameters can be configured. It is desirable that the TPC command should also be enhanced to support the scenario showed in FIG. 4. For example, one set of power control parameter {P0 #0, PL-RS #0} is configured for PUCCH resource #0, and another set of power control parameter {P0 #1, PL-RS #1} is configured for PUCCH resource #1.

In NR, a UE can be configured with up to 128 PUCCH resources and 4 PUCCH resource sets. The maximum number of PUCCH resources in the first PUCCH resource set is 32 and the maximum number of PUCCH resources in other PUCCH resource sets is 8. A P0-set with up to 8 P0 values, each with an ID, and a PL-RS set with up to 4 PL-RSs, each with an ID, may be configured for one UE in NR Release-15. The selection of PUCCH power control parameters relies on PUCCH beam indication by higher layer parameter PUCCH-spatialRelationInfo. PUCCH-spatialRelationInfo is a higher layer parameter used to indicate a transmit beam for the PUCCH resource activated by a MAC CE. Each PUCCH-spatialRelationInfo value is associated with a P0, PL-RS and a closed-loop index by higher layers. If one PUCCH-spatialRelationInfo is activated for one PUCCH resource by a MAC CE, the PUCCH resource will be transmitted with the beam indicated by the PUCCH-spatialRelationInfo and the corresponding power control parameters associated with the PUCCH-spatialRelationInfo will be applied to this PUCCH resource.

If no PUCCH-spatialRelationInfo is activated for a PUCCH resource, e.g. in the case of UL transmission before RRC connected, or PUCCH-spationalRelationInfo is not configured, e.g. in the case of PUCCH transmissions in FR1, the P0 and PL-RS with ID=0 will be used as default values.

For a PUCCH close loop power control scheme, transmit power control (TPC) commands may be carried in DCI formats 1_0 and 1_1. A TPC command carried by DCI format 1_0 or 1_1 are only applied to the PUCCH related transmission scheduled by DCI format 1_0 or 1_1.

Transmit power control commands for multiple terminals may also be carried through a DCI format 2_2 used for the transmitting of TPC commands for both the PUCCH and PUSCH.

The following information is transmitted by means of the DCI format 2_2 with CRC scrambled by TPC-PUSCH-RNTI:

block number 1, block number 2, . . . , block number N.

Parameter tpc-PUCCH provided by higher layers identifies the index to the block number for PUCCH of a cell, with the following fields defined for each block:

Closed loop indicator—0 or 1 bit;
For DCI format 2_2 with TPC-PUCCH-RNTI, the length of the closed loop indicator is 0 bit if the UE is not configured with high layer parameter two PUCCH-PC-AdjustmentStates, in which case UE assumes each block in the DCI format 2_2 is of 2 bits; otherwise, the length of the closed loop indicator is 1 bit in which case UE assumes each block in the DCI format 2_2 is of 3 bits; and
TPC command—2 bits.

Power control for PUCCH transmissions with multiple TRPs according to the present invention will be described in terms of open loop power control and close loop power control.

Open Loop Power Control

For the scenario that PUCCH transmitted to single TRP in FR1, single P0 value and single PL-RS may be configured for the UE to determine the transmit power to be applied to transmit on PUCCH. However, for multiple PUCCH resources transmitted to multiple TRPs, it is not reasonable to just use one set of power control parameters, e.g. P0 and PL-RS for all PUCCH resources. Since different PUCCH resources are transmitted to different TRPs, different power control parameters sets for different PUCCH transmissions targeting different TRPs are required to cope with different channel environments. Based on this assumption, more than one P0 values and more than one PL-RSs should be configured for PUCCH resource transmissions in a multiple TRPs scenario on FR1. Each parameter set including one P0 value and one PL-RS will be used for transmitting multiple PUCCH resources targeting one TRP on FR1. Here, it needs to be determined which P0 and PL-RS should be applied to which PUCCH resource transmissions.

According to an embodiment, PUCCH groups may be defined. For example, two PUCCH groups—PUCCH-Group #0 and PUCCH-Group #1, that comprise one or more PUCCH resources may be defined for two TRPs scenario. All PUCCH resources transmitted to one TRP belong to one PUCCH group. In order to support TDMed PUCCH transmissions within a slot for separate HARQ feedback transmissions to different TRPs, PUCCH resources belonging to different groups should not overlap in the time domain Two P0-PUCCH values, e.g. P0-PUCCH #0 and P0-PUCCH #1, and two PL-RSs, PL-RS #0 and PL-RS #1 are configured for one UE in FR1 targeting two TRPs. The first P0-PUCCH, i.e. P0-PUCCH #0, and the first PL-RS, i.e. PL-RS #0, are used to determine the transmit power for all PUCCH resources within PUCCH-Group #0, where as the second P0-PUCCH, i.e. P0-PUCCH #1, and the second PL-RS, i.e. PL-RS #1, are used to determine the transmit power for all PUCCH resources within PUCCH-Group #1.

The same principle may be applied to FR2. More than 8 P0 values and more than 4 PL-RSs are required for one UE to transmit to multiple TRPs in FR2. P0-PUCCH(s) and PL-RS(s) for one TRP may be contained in one P0-Set and PL-RS-Set. The association between PUCCH groups and power control parameters sets in this case will be described with reference to FIG. 5.

Figure 5:
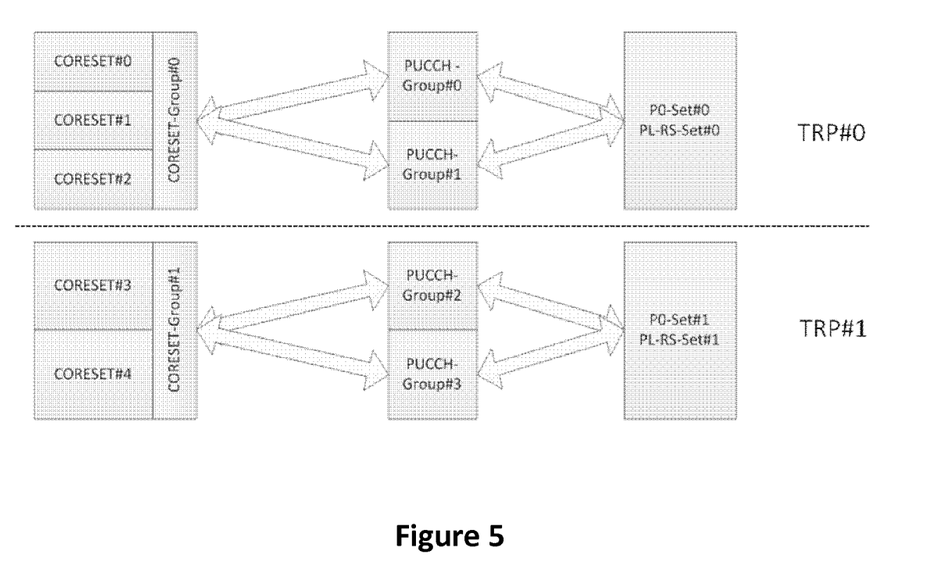
FIG. 5 is a schematic illustrating the association between CORESET groups and PUCCH groups and power control parameter sets according to embodiments of the invention.

FIG. 5 is a schematic illustrating the association between CORESET groups and PUCCH groups and power control parameter sets according to embodiments of this invention.

According to one embodiment, more than 8 P0 values and more than 4 PL-RSs may be configured for one UE. For example, 16 P0-PUCCH values, e.g. P0-PUCCH #0, 1, 2, . . . , 15, and 8 PL-RSs, e.g. PL-RS #0, 1, 2, . . . , 7, are configured for one UE, and the corresponding P0-Sets and PL-RS-Sets are defined as follows:

P0-Set #0::={P0-PUCCH #0, P0-PUCCH #1, P0-PUCCH #2, P0-PUCCH #3, P0-PUCCH #4, P0-PUCCH #5, P0-PUCCH #6, P0-PUCCH #7},

P0-Set #1::={P0-PUCCH #8, P0-PUCCH #9, P0-PUCCH #10, P0-PUCCH #11, P0-PUCCH #12, P0-PUCCH #13, P0-PUCCH #14, P0-PUCCH #15},

PL-RS-Set #0::={PL-RS #0, PL-RS #1, PL-RS #2, PL-RS #3},

PL-RS-Set #1::={PL-RS #4, PL-RS #5, PL-RS #6, PL-RS #7}.

Multiple PUCCH groups may be configured for one TRP to support simultaneous updating spatialRelationInfo for multiple PUCCH resources by one MAC CE. For example, all PUCCH resources share the same spatialRelationInfo value may be defined as a PUCCH group and multiple PUCCH groups may be defined for different TRPs. The way to build the association between PUCCH groups and the parameters set for one TRP will be described.

Method 1: Based on the CORESET Groups

CORESET is a set of RBs in the frequency domain and a set of symbols in the time domain, and the resources identified by the CORESET are used to transmit the DCI. According to an embodiment, multiple CORESETs may be grouped into several CORESET groups, each CORESET group corresponding to one TRP. And each CORESET group is associated with one or more PUCCH groups. As described above, each PUCCH group is associated with one P0-set and a PL-RS-Set. The relationship among CORESET groups, PUCCH groups and power control parameter sets is shown in FIG. 5.

With reference to FIG. 5, the upper row is for TRP #0 and the lower is for TRP #1. Three CORESETs, e.g. CORESET #0, CORESET #1 and CORESET #2, are defined as CORESET Group #0, and two CORESETs, e.g. CORESET #3 and CORESET #4, are defined as CORESET Group #1. CORESET-Group #0 is associated with PUCCH groups PUCCH-Group #0 and PUCCH-Group #1, and CORESET-Group #1 is also associated with PUCCH groups PUCCH-Group #2 and PUCCH-Group #3. As described above, P0-Set #0 and PL-RS-Set #0 are associated with PUCCH-Group #0 and PUCCH-Group #1, while P0-Set #1 and PL-RS-Set #1 are associated with PUCCH-Group #2 and PUCCH-Group #3. It means that power control parameters included in the P0-Set #0 and the PL-RS-Set #0 can only be used for transmitting PUCCH resources in the PUCCH-Group #0 and the PUCCH-Group #1, and power control parameters included in the P0-Set #1 and the PL-RS-Set #1 can only be used for transmitting PUCCH resources in the PUCCH-Group #2 and the PUCCH-Group #3.

In this embodiment, all PUCCH resources within one PUCCH group share the same spatialRelationInfo value and transmitted to the same TRP.

The CORESET groups may be configured by using the following higher layer signaling, with one or more PUCCH groups associated with each CORESET group.

TABLE 1

| ControlResourceSetGroup information element |
|---|
| ControlResourceSetGroup information element |

ControlResourceSetGroup ::= SEQUENCE {
  controlResourceSetGroupId ControlResourceSetId,
  controlResourceSetList SEQUENCE (SIZE (1..maxNrofcontrolResourceSetPerGroup)) OF
ControlResourceSetId
  associatedPUCCH-Group SEQUENCE (SIZE (1..maxNrofAssociatedPucchGroupPerGroup)) OF PUCCHGroupID
}
ControlResourceSetGroupId ::=                INTEGER (0..maxNrofControlResourceSetGroups-1)

ControlResourceSetGroup field descriptions controlResourceSetList
This list contains a list of controlResourceSet IDs belongs to the corresponding group.
maxNrofcontrolResourceSetPerGroup
The maximum number of CORESETs per group.
maxNrofControlResourceSetGroups
The maximum number of CORESET groups configured for one UE.
associatedPUCCH-Group TABLE 1-continued ControlResourceSetGroup information element This list contains a list of PUCCH group IDs associated with this CORESET Group.
maxNrofAssociatedPucchGroupPerGroup
The maximum number of PUCCH groups associated with one CORESET group.

As described in Table 1, the higher layer parameter associatedPUCCH-Group contains a list of PUCCH group IDs associated with this CORESET group.

A PUCCH group may be defined by the following higher layer signaling, and the associated P0 set and the PL-RS set may be contained in each PUCCH group.

In this way, CORESET groups, PUCCH groups and power control parameters sets are associated with each other. Specifically, upon receiving a PDCCH transmitted using the resource identified by a CORESET, e.g. CORESET #0, from a TRP, since CORESET #0 belongs to CORESET-Group #0,

TABLE 2

PUCCH-Config information element

PUCCH-Config information element

```
...
PUCCH-Group ::=                    SEQUENCE {
  pucch-Group-Id                   PUCCH-Group-Id,
  resourceList   SEQUENCE (SIZE (1..maxNrofPUCCH-ResourcesPerGroup)) OF PUCCH-ResourceId,
  associatedP0-set                 P0-Set-Id,
  associatedPathlossReferenceRS-set   pucch-PathlossReferenceRS-set-Id
}
PUCCH-Group-Id ::=                 INTEGER (0..maxNrofPUCCH-Groups-1)
...
```

ControlResourceSetGroup field descriptions associatedP0-set
Indicate the ID of P0-set associated with this PUCCH group.
associatedPathlossReferenceRS-Set
Indicate the ID of PathlossReferenceRS-Set associated with this PUCCH group.

As described in Table 2, the higher layer parameter associatedP0-set indicates the ID of P0-set associated with this PUCCH group, and the higher layer parameter associatedPathlossReferenceRS-set indicates the ID of PL-RS set associated with this PUCCH group.

Multiple P0 set and PL-RS set may be configured by the following higher layer signaling.

UE knows the PDCCH is transmitted from TRP #0. UE refers to associatedPUCCH-Group to acquire the list of PUCCH group IDs associated with CORESET-Group #0, which are PUCCH-Group #0 and PUCCH-Group #1. Next, UE refers to associatedP0-set and associatedPathlossReferenceRS-set to acquire P0-set and PL-RS set to be applied.

TABLE 3

PUCCH-PowerControl information element

PUCCH-PowerControl information element

```
...
PUCCH-PowerControl ::=   SEQUENCE {
  ...
  p0-Set0                  SEQUENCE (SIZE (1..maxNrofPUCCH-P0-PerSet)) OF P0-PUCCH         OPTIONAL, -- Need M
  p0-Set1                  SEQUENCE (SIZE (1..maxNrofPUCCH-P0-PerSet)) OF P0-PUCCH         OPTIONAL, -- Need M
PUCCH-PathlossReferenceRS-Set ::=                              SEQUENCE {
  pucch-PathlossReferenceRS-Set-Id                             PUCCH-PathlossReferenceRS-Set-Id,
  pucch-PathlossReferenceRSList   SEQUENCE (SIZE (1..maxNrofpucch-PathlossReferenceRSPerSet))
OF pucch-PathlossReferenceRS-Id,
}
PUCCH-PathlossReferenceRS-Set-Id ::=          INTEGER (0..maxNrofPUCCH-PathlossReferenceRSSets-1)
...
```

ControlResourceSetGroup field descriptions

P0-set0/P0-set1
A set with dedicated P0 values for PUCCH.
pucch-PathlossReferenceRSList
This list contains a list of pucch-PathlossReferenceRS IDs belongs to the corresponding set.
maxNrofpucch-PathlossReferenceRSPerGroup
The maximum number of PathlossReferenceRS per set.

Method 2: Based on an Index

Multiple PDCCH based multi-TRP transmissions will be supported for non-ideal backhaul that requires a separate HARQ feedback for this scenario. It has been agreed that an additional index may be configured for each CORESET to generate separate HARQ feedback. Specifically, UE may determine the TRP from which a PDSCH is transmitted through the index configured for a CORESET, using which, a PDCCH is transmitted to schedule the corresponding PDSCH transmission. Therefore, UE may transmit a separate HARQ feedback for each PDSCH transmission received from different TRPs.

TDMed PUCCH transmissions within the same or different slot targeting different TRPs should be supported at least for separate HARQ feedbacks.

Based on the above assumption, the indices configured for each CORESET may also be configured for each PUCCH group, P0-Set and PL-RS-Set in order to build the association among different parameters sets. According to an embodiment, the PUCCH group will be associated with the CORESETs which are configured with the same indices value. And the P0-Set and PL-RS-Set will be associated with the PUCCH group which configured with the same indices value.

For example, if index #0=300 is configured for CORESET #0, CORESET #1 and CORESET #2, PUCCH-Group #0 and PUCCH-Group #1, P0-Set #0 and PL-RS-Set #0, and index #1=301 is configured for CORESET #3 and CORESET #4, PUCCH-Group #2 and PUCCH-Group #3, P0-Set #1 and PL-RS-Set #1, then PUCCH-Group #0 and PUCCH-Group #1 are associated with CORESET #0, CORESET #1 and CORESET #2, and PUCCH-Group #2 and PUCCH-Group #3 are associated with CORESET #3 and CORESET #4. P0-Set #0 and PL-RS-Set #0 are associated with PUCCH-Group #0 and PUCCH-Group #1, while P0-Set #1 and PL-RS-Set #1 are associated with PUCCH-Group #2 and PUCCH-Group #3.

As described above, for FR2 in Release-15, spatialRelationInfo will be configured for each PUCCH resource to indicate the transmission beam for each PUCCH transmission by a MAC CE, and each spatialRelationInfo value is associated with one P0-PUCCH value and one PL-RS by higher layers. This framework may also be applied to the multi-TRP scenario.

If spatialRelationInfo is not configured by higher layers, the first P0 and PL-RS with the lowest identity in the P0-Set and PL-RS-Set associated with the corresponding PUCCH group will be used. For example, P0-PUCCH #0 and PL-RS #0 will be used to determine the transmit power level for all the PUCCH resources within PUCCH-Group #0 and PUCCH-Group #1, while P0-PUCCH #8 and PL-RS #4 will be used to determine the transmit power for all the PUCCH resources within PUCCH-Group #2 and PUCCH-Group #3 if spatialRelationInfos are not configured for all PUCCH resources.

Close Loop Power Control

Close loop power control is determined using a TPC command. DCI format 2_2 scrambled by TPC-PUCCH-RNTI is used to transmit TPC command to be used for PUCCH transmission for a group of UEs. A UE may determine a unique TPC command field, i.e. block number n, in DCI format 2_2 based on the higher layer parameter tpc-IndexPCell or tpc-IndexPUCCH-SCell for one cell (PCell or SCell). DCI format 2_2 may be transmitted by each TRP for multiple DCI based multiple TRP scenario. One issue that needs to be addressed is how a UE can get a TPC command for different PUCCH transmissions targeting different TRPs. Two methods are provided with reference to FIG. 6.

Figure 6:
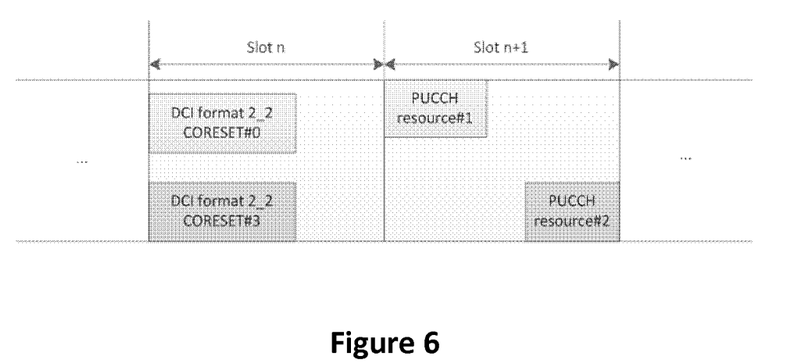
FIG. 6 is a schematic illustrating DCI format 2_2 transmitted for PUCCH close loop power control according to embodiments of the invention.

FIG. 6 is a schematic illustrating DCI format 2_2 transmitted for PUCCH close loop power control according to embodiments of the invention.

TPC command carried by DCI format 2_2 may be transmitted by each TRP with single TPC command field being configured for a UE in a cell. The TPC command transmitted by the DCI format 2_2 scrambled with TPC-PUCCH-RNTI will only be applied to the PUCCH resource within the PUCCH group associated with the CORESET or CORESET group used to transmit the DCI as described above.

For example, if UE receives a TPC command carried by a DCI format 2_2 using time-frequency resources associated with the CORESET #3, the TPC command carried by this DCI will only be applied to PUCCH resources within the PUCCH-Group #2 and the PUCCH-Group #3 as shown in FIG. 5.

For the example provided in FIG. 6, two DCI format 2_2 scrambled by TPC-PUCCH-RNTI are received by a UE in Slot n transmitted on resources associated with different CORESETs, i.e. CORESET #0 and CORESET #3. CORESET #0 is configured for TRP #0 and CORESET #3 is configured for TRP #1 as shown in FIG. 5. Two PUCCH resources, i.e. PUCCH resource #1 and PUCCH resource #2, are configured or scheduled to be transmitted in slot n+1 to TRP #0 and TRP #1, respectively. Referring back to FIG. 5, the TPC command carried by DCI format 2_2 transmitted on resources associated with the CORESET #0 will only be applied to PUCCH resource #1 and the TPC command carried by DCI format 2_2 transmitted from CORESET #3 will only be applied to PUCCH resource #2.

Figure 7:
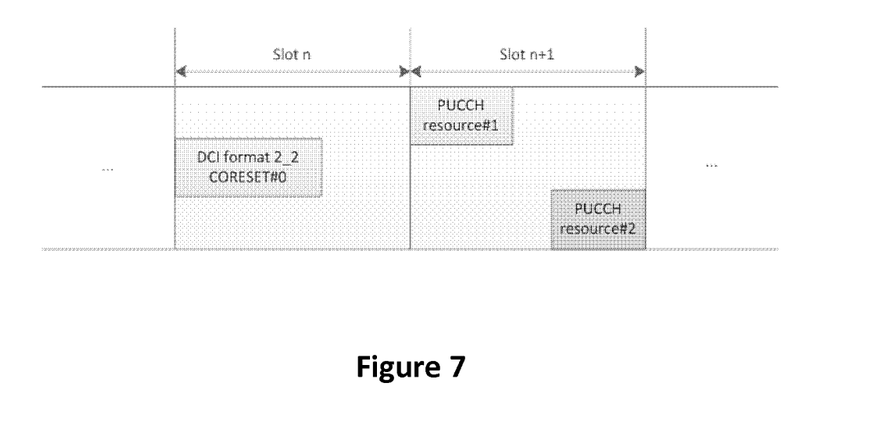
FIG. 7 is a schematic illustrating DCI format 2_2 transmitted for PUCCH close loop power control according to embodiments of the invention.

FIG. 7 is a schematic illustrating DCI format 2_2 transmitted for PUCCH close loop power control according to embodiments of the invention.

When compared with the embodiment described with reference to FIG. 6, where only one TPC command field is configured in a DCI format 2_2 for a UE in a cell, two or more TPC command fields corresponding to multiple TRPs may be configured for a UE in one cell in this embodiment. TPC command carried by DCI format 2_2 scrambled by TPC-PUCCH-RNTI transmitted on resources associated with a CORESET may be applied to any PUCCH resources. Each TPC command field corresponds to one or more PUCCH groups.

For example, two TPC command fields, e.g. the first field and the second field, are configured for one UE in PCell. The first TPC command field is applied to PUCCH-Group #0 and PUCCH-Group #1 and the second TPC command field is applied to PUCCH-Group #2 and PUCCH-Group #3. That is, the first TPC command field will be applied for transmission of the PUCCH resources within PUCCH-Group #0 and PUCCH-Group #1 and the second TPC command field will be applied for transmission of the PUCCH resources within PUCCH-Group #2 and PUCCH-Group #3 as shown in FIG. 5.

For example, the higher layers configure two block numbers indices i.e. tpc-IndexPCell0 and tpc-IndexPCell1, for the UE in the PCell for multiple-DCI based multiple TRPs scenario. The TPC command corresponding to the block number with index=tpc-IndexPCell0 is used to determine transmit power level of a PUCCH resource within the PUCCH-Group #0 and PUCCH-Group #1, while TPC command corresponding to the block number with index=tpc-IndexPCell1 is used to determine the transmit power of a PUCCH resource within the PUCCH-Group #2 and PUCCH-Group #3 based on the configuration as shown in FIG. 5.

For the example provided in FIG. 7, a UE receives a DCI format 2_2 transmitted on time-frequency resources associated with the CORESET #0 in Slot n with two TPC command fields assigned to the UE. Two PUCCH resources, i.e. PUCCH resource #1 and PUCCH resource #2, are scheduled to be transmitted in slot n+1 to TRP #0 and TRP #1, respectively. The TPC command corresponding to the first field indicated by tpc-IndexPCell0 will only be applied to PUCCH resource #1 transmission, and the TPC command corresponding to the second field indicated by tpc-IndexPCell 1 will only be applied to PUCCH resource #2 transmission.

If two or more DCI format 2_2 scrambled by TPC-PUCCH-RNTI are received in the same slot, the TPC command carried by the DCIs transmitted on resources associated with the CORESET with the lowest CORESET-ID among all the CORESETs configured for this UE will be applied to the PUCCH transmission.

Figure 8:
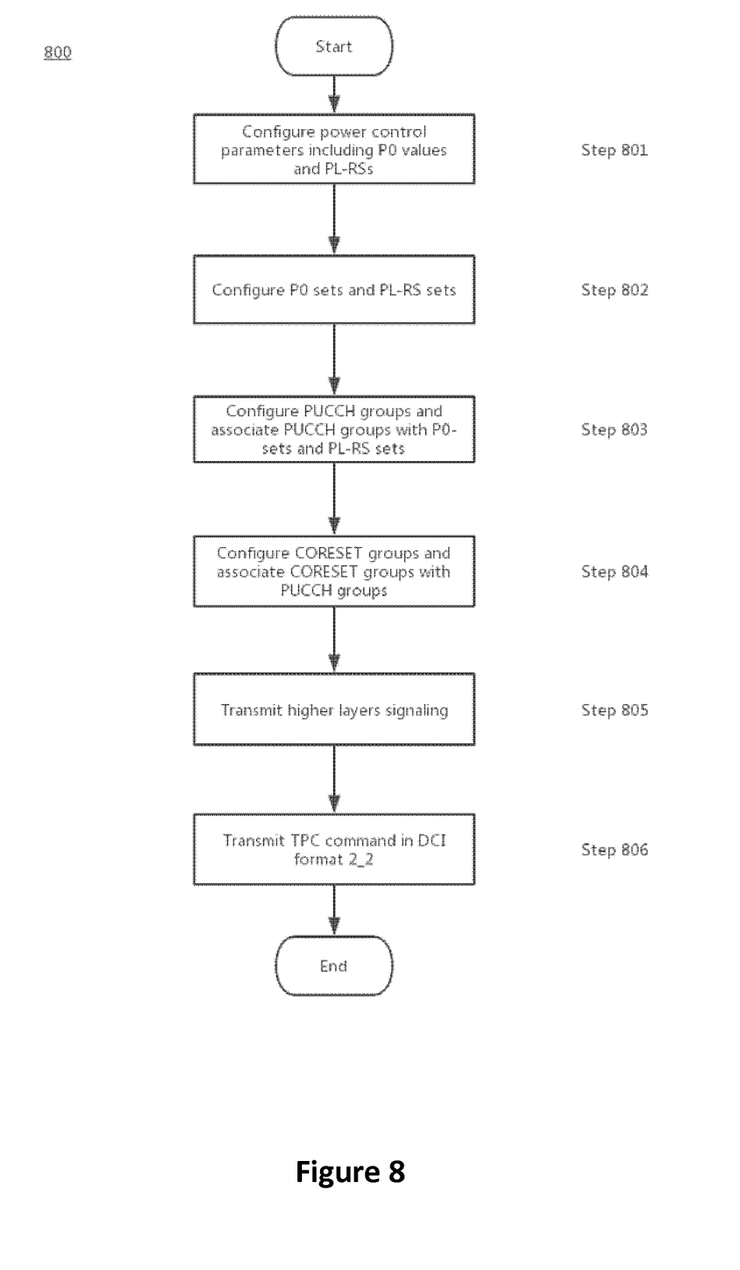
FIG. 8 is a flow chart illustrating the power control procedure performed at gNB according to the embodiments of the invention.

FIG. 8 is a flow chart illustrating the power control procedure performed at gNB according to the embodiments of the invention.

FIG. 8, presents a procedure performed at gNB to control a power level of a PUCCH transmissions with multiple TRPs. At step 801, gNB configures power control parameters for PUCCH transmissions by higher layers. The power control parameters include more than 8 P0 values and more than 4 PL-RSs.

At step 802, gNB configures P0 sets each of which includes one or more P0 values and PL-RS sets each of which includes one or more PL-RSs for UE by higher layers signaling. The configuration may be based on Table 3.

At step 803, gNB configures PUCCH groups each of which includes one or more PUCCH resources for UE by higher layers signaling. Each PUCCH group is associated with a P0 set and a PL-RS set. The configuration may be based on Table 2.

At step 804, gNB configures CORESET groups each of which includes one or more CORESETs for UE by higher layers signaling. Each CORESET group is associated with one or more PUCCH groups. The configuration may be based on Table 1.

At step 805, gNB transmits higher layers signaling including the configuration of CORESET groups, PUCCH groups and P0 sets and PL-RS sets to UE.

At step 806, gNB transmits TPC command in DCI format 2_2. One or more TPC command fields may be configured in DCI format 2_2 for a UE in a cell. Two methods for transmitting TPC command including one or more TPC command fields in DCI format 2_2 in the close loop power control procedure have been described with reference to FIG. 6 and FIG. 7. With these two methods, UE may acquire corresponding TPC commands for different PUCCH transmission to different TRPs.

It should be noted that the steps described above are not all necessary. It is possible to perform only some of these steps. The order of steps is also not mandatory but may be performed in other orders or in parallel. The execution of some steps requires signaling. The collective signaling described in the specification as being used for multiple steps may be replaced with separate signaling for individual step.

With respect to the procedure performed at UE for open loop power control for PUCCH transmissions, UE receives higher layers signaling from a gNB to acquire the configuration of CORESET groups, PUCCH groups and P0 sets and PL-RS sets. With the solution described with reference to FIG. 5 in the section of open loop power control, UE determines the power control parameters P0 and PL-RS.

With respect to the procedure performed at UE for close loop power control for PUCCH transmissions, UE receives a DCI format 2_2 from a gNB to acquire TPC command. With the solution described with reference to FIG. 6 and FIG. 7 in the section of close loop power control, UE determines the corresponding TPC command to be applied. Since the detailed procedure performed at UE has been described herebefore, separate flow chat and corresponding description are omitted.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

With the disclosure described in the invention, enhancement of the power control including open loop and close loop for the PUCCH transmitted to multiple TRPs is supported. Specifically, different P0 sets and PL-RS sets are defined. Multiple PUCCH groups are defined and each group associates with one P0 set and one PL-RS set. If spatialRelationInfo is not configured, the first P0 and PL-RS with the lowest index in the P0-set and PL-RS-set associated with the corresponding PUCCH group will be used. If single TPC command field is configured for one UE in a carrier for DCI format 2_2, the TPC command carried by DCI format 2_2 will only be applied to the PUCCH groups associated with the CORESET group transmitting the DCI. Multiple TPC command fields may be configured for one UE in a carrier in DCI format 2_2 for multiple PUCCH groups.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
transmitting, to a remote unit, multiple power control parameters for physical uplink control channel (PUCCH) by higher layers signaling; and transmitting, to the remote unit, a transmit power control (TPC) command with downlink control information (DCI) format 2_2 scrambled by transmit power control-physical uplink control channel-radio network temporary identity (TPC-PUCCH-RNTI), the TPC command comprising:
   a first TPC command field associated with a first plurality of PUCCH groups, each PUCCH group of the first plurality of PUCCH groups comprising one or more PUCCH resources; and
   a second TPC command field associated with a second plurality of PUCCH groups, the second plurality of PUCCH groups being different from the first plurality of PUCCH groups,
wherein the power control parameters include more than 8 P0 values and more than 4 pathloss reference signals (PL-RSs).

2. The method of claim 1, further comprising configuring the P0 values and the PL-RSs by configuring one or more P0-sets, each of which contains one or more of the P0 values, and one or more PL-RS sets, each of which contains one or more of the PL-RSs.

3. The method of claim 2, further comprising:
configuring one or more PUCCH groups each of which contains one or more PUCCH resources transmitted to the same TRP for the remote unit by higher layers signaling,
wherein the first plurality of PUCCH groups and the second plurality of PUCCH groups comprise a first plurality of PUCCH groups and a second plurality of PUCCH groups of the one or more PUCCH groups and each of the one or more PUCCH groups is associated with one of the P0-sets and one of the PL-RS sets.

4. The method of claim 3, further comprising:
configuring one or more control resource set (CORESET) groups for the remote unit by higher layers signaling,
wherein each of CORESET groups contains one or more CORESETs configured for the same TRP, and
wherein each of the CORESET groups is associated with the one or more PUCCH groups.

5. The method of claim 1, wherein the first TPC command field and the second TPC command field comprise TPC command fields for the remote unit in a cell.

6. The method of claim 5, further comprising:
transmitting two or more block number indices in the TPC command to the remote unit, wherein the two or more block number indices are assigned to the remote unit in a cell and each block number index corresponds to one TPC command field of the TPC command fields.

7. The method of claim 1, wherein the power control parameters include more than 15 P0 values and more than 7 pathloss reference signals (PL-RSs).

8. A base station, comprising:
at least one memory; and
at least one processor coupled with the at least one memory and configured cause the base station to:
   transmit, to a remote unit, multiple power control parameters for physical uplink control channel (PUCCH) by higher layers signaling; and
   transmit, to the remote unit, a transmit power control (TPC) command with downlink control information (DCI) format 2_2 scrambled by transmit power control-physical uplink control channel-radio network temporary identity (TPC-PUCCH-RNTI) the TPC command comprising:
      a first TPC command field associated with a first plurality of PUCCH groups, each PUCCH group of the first plurality of PUCCH groups comprising one or more PUCCH resources; and
      a second TPC command field associated with a second plurality of PUCCH groups, the second plurality of PUCCH groups being different from the first plurality of PUCCH groups,
wherein the power control parameters include more than 8 P0 values and more than 4 pathloss reference signals (PL-RSs).

9. The base station of claim 8, wherein the at least one processor is further configured to:
configure one or more P0-sets each of which contains one or more of the P0 values and one or more PL-RS sets each of which contains one or more of the PL-RSs.

10. The base station of claim 9, wherein the at least one processor is further configured to:
configure one or more PUCCH groups each of which contains one or more PUCCH resources transmitted to the same TRP for the remote unit by higher layers signaling,
wherein the first plurality of PUCCH groups and the second plurality of PUCCH groups comprise a first plurality of PUCCH groups and a second plurality of PUCCH groups of the one or more PUCCH groups and each of the one or more PUCCH groups is associated with one of the P0-sets and one of the PL-RS sets.

11. The base station of claim 9, wherein the at least one processor is further configured to:
configure one or more control resource set (CORESET) groups for the remote unit by higher layers signaling,
wherein each of CORESET groups contains one or more CORESETs configured for the same TRP,
wherein each of the CORESET groups is associated with one or more PUCCH groups.

12. The base station of claim 11, wherein the at least one processor is further configured to:
transmit two or more block number indices in the TPC command to the remote unit, wherein the two or more block number indices are assigned to the remote unit in a cell and each block number index corresponds to one TPC command field of the TPC command fields.

13. The base station of claim 8, wherein the first TPC command field and the second TPC command field comprise TPC command fields for the remote unit in a cell.

14. A user equipment (UE), comprising:
at least one memory; and
at least one processor coupled to with the at least one memory and configured to cause the UE to:
   receive multiple power control parameters for physical uplink control channel (PUCCH) from a base station, and
   receive a transmit power control (TPC) command with downlink control information (DCI) format 2_2 scrambled by transmit power control-physical uplink control channel-radio network temporary identity (TPC-PUCCH-RNTI) from the base station, the TPC command comprising:
      a first TPC command field associated with a first plurality of PUCCH groups, each PUCCH group of the first plurality of PUCCH groups comprising one or more PUCCH resources; and
      a second TPC command field associated with a second plurality of PUCCH groups, the second plurality of PUCCH groups being different from the first plurality of PUCCH groups, wherein the power control parameters include more than 8 P0 values and more than 4 pathloss reference signals (PL-RSs).

15. The UE of claim 14, wherein one or more P0-sets, each of which contains one or more of the P0 values, and one or more PL-RS sets, each of which contains one or more of the PL-RSs, are configured by higher layers signaling from the base station.

16. The UE of claim 15, wherein:
one or more PUCCH groups, each of which contains one or more PUCCH resources, are configured by higher layers signaling from the base station;
the first plurality of PUCCH groups and the second plurality of PUCCH groups comprise a first plurality of PUCCH groups and a second plurality of PUCCH groups of the one or more PUCCH groups; and
each of the PUCCH groups is associated with one of the P0-sets and one of the PL-RS sets.

17. The UE of claim 16, wherein the P0 value and PL-RS with the lowest index in a P0-set and a PL-RS-set associated with the PUCCH group are used for the PUCCH resource in the corresponding PUCCH group if a spatial relation for PUCCH is not configured by higher layers signaling from the base station.

18. The UE of claim 16, wherein the first TPC command field and the second TPC command field comprise TPC command fields for the UE in a cell, wherein each of the TPC command fields is applied to PUCCH resource(s) within the PUCCH group(s) associated with this TPC command field.

19. The UE of claim 15, wherein one or more control resource set (CORESET) groups are configured by higher layers signaling from the base station, wherein each of CORESET groups contains one or more CORESETs configured for the same TRP, and wherein each of the CORESET groups is associated with one or more PUCCH groups.

20. The UE of claim 19, wherein a TPC command carried by a DCI transmitted from the CORESET using the lowest CORESET-ID among all the CORESETs configured for this UE will be applied to the PUCCH, if two or more DCI format 2_2 scrambled by TPC-PUCCH-RNTI are received in one slot.

* * * * *